United States Patent [19]

Fowler, Jr. et al.

[11] Patent Number: 4,695,494
[45] Date of Patent: Sep. 22, 1987

[54] FIRE-RESISTANT ARTICLE AND METHOD OF MANUFACTURE

[75] Inventors: George F. Fowler, Jr., Norcross; Charles W. Lehnert, Stone Mountain, both of Ga.

[73] Assignee: Georgia-Pacific Corporation, Atlanta, Ga.

[21] Appl. No.: 934,726

[22] Filed: Nov. 25, 1986

[51] Int. Cl.$^4$ .......................... E04B 1/74; E04B 2/28; B32B 3/26; B28B 3/00
[52] U.S. Cl. ........................................ 428/71; 252/62; 264/109; 264/122; 264/333; 428/313.7; 428/446; 428/532; 428/920
[58] Field of Search ................. 252/62; 264/109, 122, 264/333; 428/71, 313.7, 446, 532, 920

[56] References Cited

U.S. PATENT DOCUMENTS

| | | | |
|---|---|---|---|
| 3,408,316 | 10/1968 | Mueller et al. | 252/62 |
| 3,904,539 | 9/1975 | Ruff | 252/62 |
| 3,952,830 | 4/1976 | Oshida et al. | 252/62 |
| 4,159,302 | 6/1979 | Greve et al. | 264/333 |
| 4,297,311 | 10/1981 | Sherman et al. | 264/109 |
| 4,343,127 | 8/1982 | Greve et al. | 428/920 |

Primary Examiner—William J. Van Balen
Attorney, Agent, or Firm—John T. Synnestvedt; Alexis Barron

[57] ABSTRACT

A fire-resistant article, for example, a fire door core comprising a major amount of expanded perlite in compressed form, an adhesive material, the major portion of which is starch, and preferably glass fibers, and a method for making the article by dry-mixing the ingredients substantially completely before water is added for the purpose of developing the adhesive characteristics of the starch.

18 Claims, 4 Drawing Figures

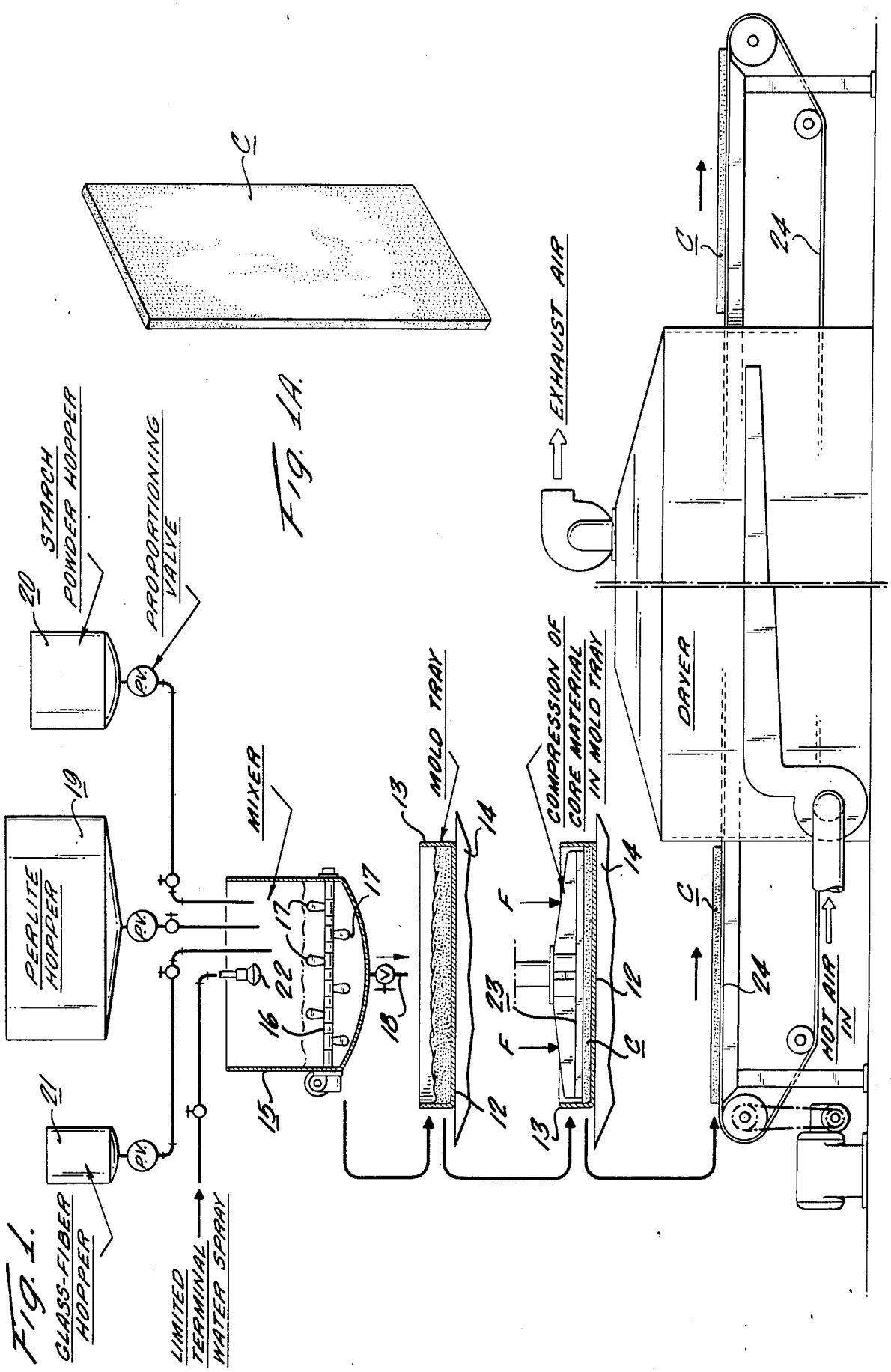

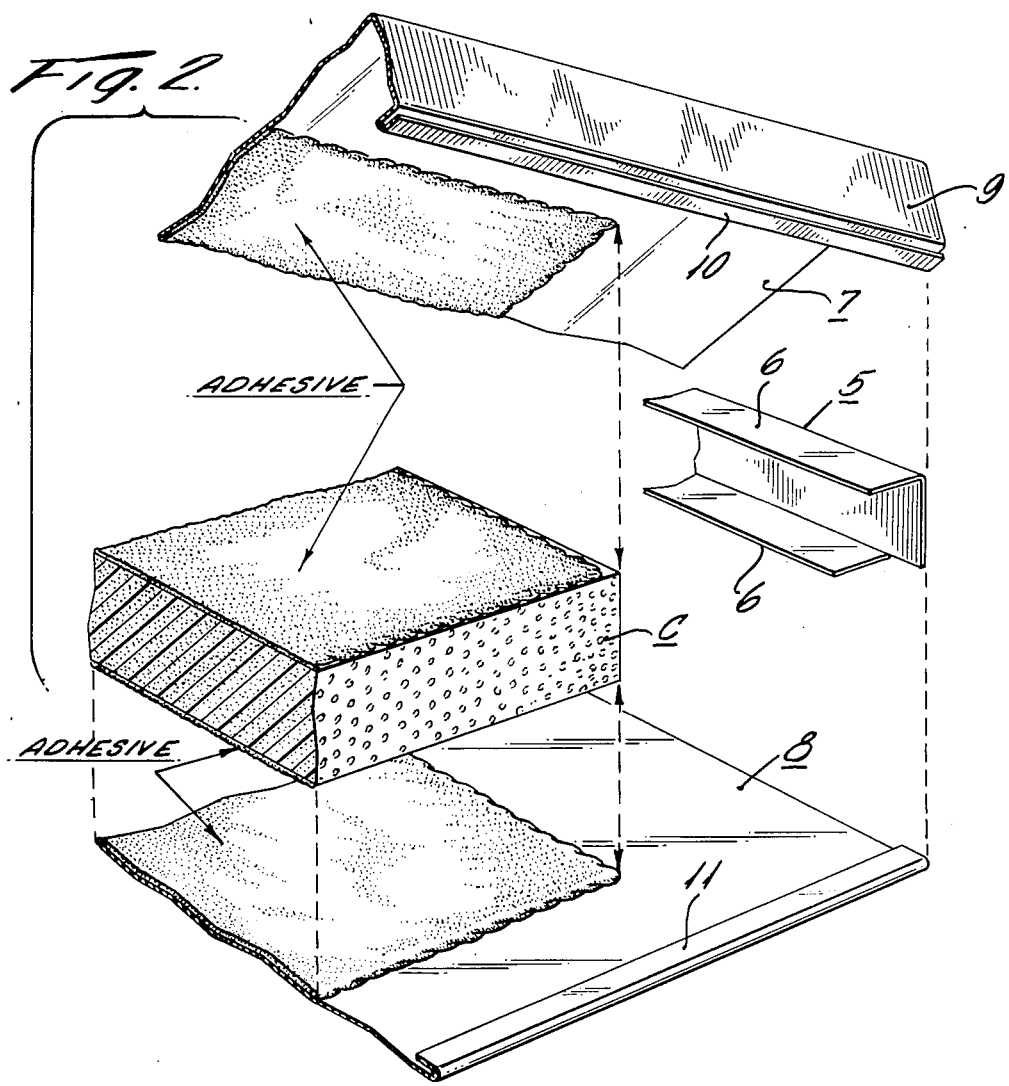
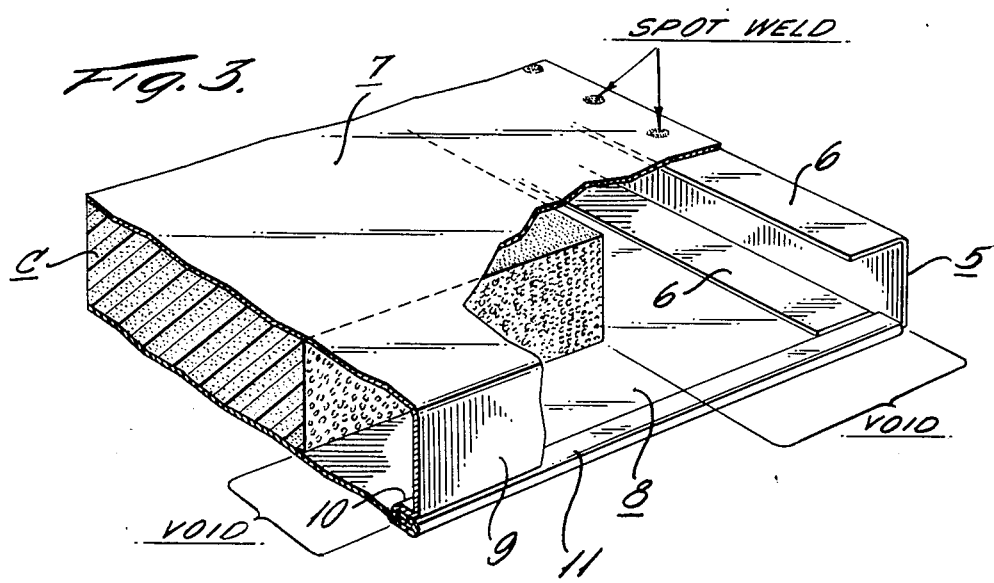

FIRE-RESISTANT ARTICLE AND METHOD OF MANUFACTURE

BACKGROUND AND STATEMENT OF OBJECTS

This invention relates to fire-resistant articles, for example, fire doors, and is especially related to cores of such doors, particularly cores of the type adapted to be enclosed between sheet metal door edge and side face components.

One of the primary objectives of the invention is to provide a fire door of relatively light weight, and for this purpose, the invention contemplates the manufacture of a door core by a molding technique which provides a core which is not only of light weight but which is also of relatively high strength.

In accordance with another objective, the invention provides a technique for production of a fire door core which has adequate strength in the processing stages to withstand handling, treating and assembly of parts, even before the final curing of the core structure.

REPORTED DEVELOPMENTS

It is already known to manufacture fire door cores and enclose those cores either within sheet metal, or within wood or similar veneer enclosure sheets and components.

A commercially-available metal fire door includes a core principally consisting of a composition which contains mineral fibers and a binder. Exemplary properties of such a core are a density of about 19 lb/cu ft, a compressive strength (12% deformation at 100 psi) of 150 psi, a tensile strength of about 280 lb/sq ft and a flexural strength of about 129 lb (6"×16"×1.65 over a 14" span). The cohesive strength of this type of core is such that the core tends to come apart. This adversely affects the structural integrity of the door. In addition, such cores are friable. Thus, in handling the cores and assembling the doors, particles of dust enter the air. This is irritating to workmen.

Reference is made also to prior U.S. Pat. Nos. 4,159,302 and 4,343,127, both of which disclose fire doors in which molded cores are enclosed within wood or veneer enclosure sheets. The cores of the doors described in these patents comprise particles of expanded perlite which are adhered together by the use of a mixture of various hydraulic binders, including gypsum, cement, and an organic adhesive material. The aforementioned patents disclose exemplary densities of door cores of about 22 to about 30 lbs/cu ft. These patents disclose further that the door cores have a sufficiently high green strength so as to be shaperetaining and to withstand handling from the time that the core is formed to the time it is subjected to drying conditions. Manufacture of the core into its desired shape generally involves compressing the mixture of ingredients comprising the core in a mold to compact the mixture to the desired density and thickness. After such compression, the strength of the freshly compressed core, that is, the green strength thereof, must be sufficiently high for the core to retain its shape and not be damaged as it is removed from the mold and further processed through the drying stage of the manufacturing operation.

As described below, one of the aspects of the present invention concerns the provision of a composition which can be fabricated into a door core of even lower density than the density of those cores disclosed in the aforementioned patents and having sufficient green strength to withstand handling during the manufacturing operation.

In the above-mentioned patents, techniques are disclosed for mixing the ingredients from which the core is formed, such ingredients comprising expanded perlite and a mixture of hydraulic binders, including a hydraulic organic binder, for example, starch. The technique recommended in the aforementioned patents for mixing the ingredients comprising the core involves preliminary mixing the organic binder with water and then adding this aqueous/organic binder composition to a dry mixture of the other ingredients from which the core is made. This technique involves incorporating into the core formulation the organic binder in a form in which its adhesive characteristics have been developed as a result of its having been mixed with water.

SUMMARY OF THE INVENTION

In contrast with the foregoing, the technique of the present invention provides for the intermixture of a starch component to be relied upon for the adhesive effect, but the condition of the starch component at the time of bringing it together with the other ingredients is such that it does not have the adhesive or sticky characteristics ultimately required in order to bond the materials together.

According to one aspect of the present invention, the intermixture of the various ingredients, including the non-adhesive, dry starch particles, is accomplished and the mixture virtually completely effected before the addition of water, which is ultimately required in order to impart the adhesive characteristic to the starch component and thus provide for bonding of the ingredients together.

Another aspect of the present invention is the provision of an article of manufacture which is particularly suited for use as the core of a fire door, such as a door in which a fire-resistant core is sandwiched between two metal sheets. The article of the present invention comprises a major amount of expanded perlite in compressed form and a minor amount of an adhesive material, the major portion of the adhesive material comprising starch. In preferred form, starch comprises substantially all of the adhesive material. In addition, a preferred embodiment of the present invention comprises a core which has a density of no greater than about 22 lb/cu ft, most preferably a density of about 16 to about 20 lb/cu ft.

Articles of the present invention, including fire door cores, can in general be manufactured by a process which includes forming a mixture of the ingredients comprising the core into the desired shape, thereafter compressing the mixture to its desired density and thickness, and then drying the compressed article under conditions such that the development of the final strength properties of the article is accelerated. As will be seen from the discussion which follows, the present invention involves the use of preferred manufacturing techniques to insure development of sufficient green strength in the freshly compressed article, as well as the provision of an article having satisfactory final strength and other desired properties.

The preferred process for manufacturing the core of the present invention involves preparing a batch of formulation of the ingredients comprising the core in an amount approximately sufficient to form but a single core. The preparation of a batch of formulation sufficient to form but one core avoids various problems which are encountered when preparing the formulation in amounts sufficient to manufacture more than one core. Such problems are triggered as a result of aging of the formulation, as but a portion thereof can be used promptly in forming a core.

In a preferred manufacturing technique of the present invention, the water required to develop the adhesive bonding of the starch is sprayed into the mixing chamber close to the end of the mixing cycle for the formulation to be used for each core. For instance, in a preestablished cycle of approximately 30 seconds for the intermixture of the ingredients, substantially all of the water is added within about 10 seconds before the end of the mixing cycle of the formulation comprising the individual core.

The present invention provides a fire door core which has a combination of properties which it is believed has not heretofore been available in perlitebased fire door cores of the prior art. Such combination of properties includes satisfactory green strength, a relatively low density, and satisfactory final strength and fire-resistant characteristics which enable fire doors comprising such cores to pass industry-accepted fire tests.

BRIEF DESCRIPTION OF THE DRAWINGS

How the foregoing objects and advantages are attained will appear more fully from the accompanying drawings, in which:

FIG. 1A is a perspective view of a door core of a typical shape contemplated for preparation according to the present invention;

FIG. 1 is a schematic view diagrammatically illustrating the major components of the production equipment;

FIG. 2 is a fragmentary exploded view of the corner of components of a completed door incorporating the core of the present invention and showing the metallic parts intended to be applied to the surfaces of the core; and FIG. 3 is a fragmentary view of the corner of the door with the components shown in assembled relation, but with parts broken out for purposes of illustration.

DETAILED DESCRIPTION OF THE INVENTION

Although the present invention may be employed in connection with the production of door cores for a variety of purposes and for doors of a variety of sizes and shapes, in a typical case, the door core approximates the size and shape of the interior of a door commonly employed in various kinds of buildings in order to close a passageway through which workers or personnel pass. A door core of such proportions is generally indicated by the letter C in FIG. 1A, and it will be seen that in this typical core, the vertical dimension is approximately twice the lateral dimension. In a typical case, the thickness of the core would be of the order of about 1 to 2 inches.

For purposes of fire protection, it is important that the cores employed in such doores be formed of fire-resistant materials, and in a typical fire door having a metal enclosure, the enclosure parts may comprise components as shown in FIGS. 2 and 3 and described herebelow.

Thus, in FIGS. 2 and 3, it will be seen that a channel formed of sheet metal is adapted to be fitted adjacent to a top or bottom edge of the door, such a channel having a web or base 5 and side flanges 6—6, this part being indicated in FIGS. 2 and 3 as a "CAP", which, as indicated, may be employed either at the top or bottom of the door, although it is sometimes desirable to employ differently shaped or constructed edge pieces at the top and bottom. Such differently shaped or constructed edge pieces are already known and form no part of the present invention per se.

Although the metal enclosure may take a variety of forms, in a typical case, as shown in FIGS. 2 and 3, a metal sheet 7 is provided at one face of the door and another metal sheet 8 is provided at the other face of the door. The sheet 7 advantageously is provided with a side edge portion 9 extended at right angles to the general plane of the door and having a bent flange 10 at its free edge adapted to interengage with the bent flange 11 provided at the corresponding edge of the side sheet 8 at the opposite face of the door.

From FIG. 3, it will be noted that the side sheets 7 and 8 and the side edge portions 9, and also the bent flanges 10 and 11, are all proportioned and dimensioned so as to interfit and interengage while leaving a "VOID" space along the side edges of the door, as is indicated in FIG. 3. In addition, the caps at the top and bottom of the door are also proportioned so as to provide a void space at least above the top edge of the core, and if desired, also below the lower edge of the core. Preferably, the caps at the top and bottom are also secured to the metal side sheets 7 and 8, as by spot welding indicated in FIG. 3.

It is known to employ metal sheet-covered fire doors of the general type briefly described above, and it is also known to provide the void spaces at the vertical edges and at least at the top edge. In addition, the side sheets 7 and 8 are advantageously adhesively secured to the side faces of the core C.

The present invention is particularly concerned with the provision of a door core of the novel composition above referred to having improved characterstics, especially the weight and strength characteristics. The invention is also concerned with a novel process for producing such a core, including a production system, as is diagramatically shown in FIG. 1.

The core is indicated in the lower portions of FIG. 1 by the letter C, in the same manner as in FIGS. 1A and in FIGS. 2 and 3. Basically, the technique employed for making the core is a molding technique, and for that purpose, it is preferable to employ a mold in the form of a tray, as is shown in FIG. 1. The mold tray has a bottom wall 12 and side and end edge walls, such as indicated at 13. For purposes of loading or filling the mold, the mold tray is advantageously mounted on a support 14 in a position to be filled through the upper open side of the mold tray.

The materials to be employed for forming the core are primarily particulate materials which are initially mixed dry in the mixer 15, being churned and thoroughly interdispersed by means of the rotative shaft 16 having mixing paddles 17 or other effective mixing equipment. When the mixture is prepared for delivery into the mold tray, provision is made by means of a channel, such as diagrammatically indicated at 18, for delivery and distribution of the mixed material throughout the area of the mold tray. For this purpose, either elongated delivery openings 18, or lateral motions of the mold tray, may be employed in order to provide a substantially uniform overall layer of the mixed materials on the bottom wall of the mold tray.

The materials delivered into the mixer 15 comprise primarily expanded perlite which may be introduced from the perlite hopper 19 under the control of appropriate valving or gate arrangements. Starch in powder form may be introduced into the mixer from a bin 20, appropriate valving again being employed for this purpose. In the preferred embodiment of the invention, a small amount of glass fibers is also introduced into the mixer, and if this component is employed, such fibers may be introduced by way of the hopper 21.

In the mixing technique of the present invention, the particulate materials are introduced from the hoppers or other supply vessels 19, 20 and 21, and are thoroughly intermixed by the action of the mixer 16-17, and a mixing cycle is set up providing adequate time, for instance, from about 18 seconds to about 22 seconds, for the thorough intermixing of the particulate materials.

Toward the end of the mixing cycle, a quantity of water is introduced, for instance, through the supply nozzle 22. In a typical example, for instance, during a period of time within about 10 seconds before the end of the mixing cycle, the water spray is introduced and then the charge which has been intermixed is promptly delivered into the mold tray, as above referred to.

By proceeding in this way, the thorough intermixture of the ingredients occurs primarily in the absence of any substantial adhesive characteristic being present, the starch also being in particulate form, rather than in a form which would have adhesive characteristics at the time of its introduction. This is of importance for a number of reasons and primarily because it enables the thorough intermixture to be effected without initiation of the adhesion of the various particles to each other. This helps preserve the desired expanded condition of the perlite and ultimately results in a product having particularly high strength characteristics in relation to the total weight of the materials involved in the core.

After delivery of a charge into the mold tray, as above described, the mold tray is then placed under a press plate, such as indicated at 23, and pressure is applied in order to compress the core to the desired density and thickness. Thereafter, the press plate is separated, and the compressed core is removed from the mold tray and placed upon a conveyor, indicated at 24, in order to carry the compressed core into and through the drying oven indicated and thereby effect the desired drying and solidification or curing of the composite mixture of the core.

It is of special advantage in the technique, as described above, that the initially compressed core is shape-retaining and of adequate strength to permit convenient manual handling of the core even before any substantial drying has occurred. Thus, the core can be manually transferred from the mold tray into the entrance end of the conveyor 24 without any subtantial danger of breakage, notwithstanding the fact that no appreciable drying of the core composition has yet occurred.

After the drying operation, of course, the strength of the core is greatly increased, and the core is capable of withstanding any normal handling for the purpose of assembling with the metallic closure walls, as shown in FIGS. 2 and 3.

The essential ingredients comprising the article of the present invention are expanded perlite and an adhesive or binder which includes starch. The article comprises a major amount of the perlite and a minor amount of the adhesive or binder, the major portion of which comprises starch. The article can include also optional ingredients, including, for example, small particle size minerals and fibrous reinforcements. Examples of the aforementioned are gypsum, nylon, polypropylene, hemp and sisal.

Of the optional ingredients, the use of glass fibers is preferred. It is believed that the presence of the glass fibers contributes to green strength and final strength and generally contributes to imparting improved handling properties to the molded composition.

As is known, expanded perlite for use in this type of application functions as a non-combustible, compactible, light weight filler which imparts to the article relatively high strength compared to other materials which might be used. The density of this light-weight material typically falls within the range of about 4.5 to about 7.5 lb/cu ft. It is preferred to use the less spongy forms of perlite. As is known, the less spongy the perlite, the greater its resistance to being compressed and the greater the strength of the article containing it. Conversely, the more spongy the perlite, the more readily it is compressed and the lower the strength of an article containing it. Preferred expanded perlite for use in the practice of the present invention has a compressibility of at least about 90 lb/sq". Such compressibility can be determined in accordance with the method of evaluation described in aforementioned U.S. Pat. No. 4,159,302.

The starch constituent of the composition is the type of starch which functions as a binder or an adhesive upon being mixed with water. It contributes to the development of green strength and final strength of the article. Such starches are gelatinized in form and are typically low water-carrying starches. (High water-carrying starches are used typically as thickening agents because of their ability to absorb relatively large amounts of water.) A preferred starch for use in the present invention is sold under the trademark STA-RAMIC 747 by A. E. Staley Manufacturing Company. This starch disperses particularly well in the dry mixture comprising the ingredients of the article and it nicely develops sufficient green strength by imparting tacky cohesiveness to the composition and also good final strength in the article.

Although the amounts of ingredients comprising the article of the present invention can vary over a wide range, it is believed that amounts of ingredients falling within the following ranges will be used most widely in the wet mixture from which the set article is formed: about 45 to about 70 wt. % of expanded perlite; about 5 to about 20 wt. % starch; and about 22 to about 34 wt. % water. When using glass fibers, this additive should comprise at least about 0.1 wt. % of the wet mixture from which the article is made.

Preferably, the wet mixture from which the article of the present invention is formed comprises:
(A) about 60 to about 65 wt. % expanded perlite;
(B) about 8 to about 12 wt. % starch;
(C) about 0.5 to about 0.8 wt. % glass fibers; and
(D) about 25 to about 30 wt. % water.

Other optional ingredients of the type mentioned above can be used in effective amounts, for example, about 1 to about 5 wt. %.

As above indicated, the ingredients including the perlite, starch and optional ingredients, if used, are dry-mixed thoroughly for a period of time sufficient to form a uniform mixture of the ingredients, with the water constituent being added at about the time the uniform mixture is produced, that is, within a time period extending from shortly before to shortly after production of the uniform mixture. By way of example, it is noted that a batch of 45 pounds of ingredients can be dry-mixed thoroughly in about 20 seconds in a standard paddle mixer. Upon adding the water to the thoroughly mixed ingredients, mixing is continued until the water in incorporated throughout the mixture. By way of example, this can be accomplished in about 10 seconds using a standard paddle mixer to prepare a 60-pound bach of formulation. The form of the wetted mixture can be described as damp and readily compactible.

The wetted mixture should be pressure-formed into the desired shape prior to the time that the water constituent is absorbed by the perlite constituent. Accordingly, it is preferred that the wetted mixture be pressure-formed into its desired shape promptly, for example, within about 15 seconds to about 3 minutes after mixing is terminated.

As the wetted mixture is pressure-formed, it can be compressed into the desired density and thickness also. In preparing fire door cores, it is recommended that the wetted mixture be compressed to about 50 to about 60% of its original volume utilizing pressures within the range of about 100 to about 200 psi for about 5 to about 10 seconds.

The green strength of the compressed wetted mixture is such that the shaped article is shape-retaining and has sufficient strength to enable it to be handled without damage as it is subjected to other steps of the manufacturing process, including a drying operation during which the final strength properties of the article are developed. In the preferred practice of the invention, drying is effected for a period of time such that the moisture content of the compressed and molded article does not exceed about 3% of the total weight of the article. Drying may be accomplished at a wide variety of temperatures, including room temperature. It is preferred that the drying be accelerated by carrying out the drying operation at elevated temperatures. It is recommended that a temperature of about 150° F. to about 300° F. be used until the desired low moisture content is obtained. This may take about 4 to about 8 hours.

After the mixture has been dried, finishing operations can be effected. For example, a fire door core can be sanded to a thickness within the required tolerance, sawed or shaped as desired. The nature of the dried material is such that finishing operations can be performed readily.

Preferred articles produced in accordance with the present invention, including fire door cores, have the following properties: (A) a density of about 10 to about 22 lb/cu ft; (B) a compressive strength of at least about 100 psi and ranging up to 150 psi or more; (C) a flexural strength of about 35 to about 175 lb (for a sample 6"×16"×1.65" over a 14" span); and (D) a tensile strength of about 10 to about 40 lb/sq in. More preferred articles include those having (E) a density of about 16 to about 20 lb/cu ft; (F) a compressive strength of at least about 140 psi; (G) a flexural strength of at least about 50 lb, typically about 50 to about 125 lb; and (H) a tensile strength of at least about 15 lb/sq in, typically about 15 to about 30 lb/sq in.

The metal side sheets 7 and 8 of a fire door prepared according to the present invention are advantageously coated with an adhesive used to bond the side sheets to the core faces. For this purpose, an adhesive, such as the product sold under the trademark PLIOBOND 2375 by Ashland Chemical Co., is desirably employed. An adhesive of this type is preferably sprayed not only upon the side faces of the core, but also upon one side face of each side wall covering sheet, and the core and the adhesively-coated sheets are then pressed together. Preferably, the handling of the pieces at this stage should be arranged so as to avoid final intimate contact of the two adhesively-coated surfaces of the core until all parts of the assembly are brought together, thereby providing for a uniformity of the adhesive contact established at both sides of the door. The assembly is then pressed together with a pinch roll.

EXAMPLES

A fire door core according to the present invention was made from a composition containing about 37 lb of expanded perlite, about 8 lb of starch, and about 0.5 lb glass fibers. The expanded perlite had a particle size distribution as set forth below.

| Mesh (U.S. Standard Sieve Series) | Percent Retained |
|---|---|
| 30 | 24 |
| 50 | 73 |
| 100 | 93.5 |

The density and compressibility of the perlite were respectively about 6 lb/cu ft and about 99 lb/sq in. The starch was an ethylated dent, pregelatinized modified corn starch comprising about 25% amylose with about 2.6–2.7% substitution of ethylene oxide. The glass fibers were fiber glass roving chopped to ½ to 1" lengths and having a diameter of about 0.0002 to about 0.0005".

The aforementioned constituents were preblended by dry mixing in a standard paddle mixer for about 20 seconds to produce a mixture throughout which the constituents were substantially uniformly dispersed. Within about 10 seconds before the mixing was terminated, 19 lb of water were sprayed into the mixture and the water was distributed throughout the mixture as mixing was continued for about 10 seconds. This operation involved a minimum of mixing to avoid fracturing or breaking the friable expanded perlite. At the end of the mixing operation, there was obtained a damp powdery, flowable composition which was free of lumps and which comprised about 57.4 wt. % expanded perlite, about 12.4% starch, about 0.8 wt. % glass fibers, and about 29.5 wt. % water. Within about 30 seconds after the mixing operation was terminated, and while the particulate compactible composition was still damp, it was transferred to an open-top mold having a shape and dimensions suitable for forming a door core of size 3' by 7'. The mixture was compressed to about 60% its volume and to a thickness of about 1.8" with the ram of a press utilizing a pressure of less than 200 psi which was applied for about 10 seconds.

Immediately after compressing and shaping the mixture into the door core, the mold was raised from the core which was then transferred on roller conveyors to an oven having a temperature of about 300° F. The green strength of the core was such that it retained its shape and was able to be handled conveniently without being damaged.

The core was removed from the oven after about 4 hours of residence time. Measurement showed that the dry core had a moisture content of about 3%. The set core had a density of about 17 lb/cu ft, a compressive strength of about 240 psi, a flexural strength of about 90 lb (6"×16"×1.65" sample tested on 14" supports), and a tensile strength of about 24 lb/sq in.

Two cores, as described above, were incorporated in a pair of 20-gage steel door shells. The doors were subjected to a fire test in accordance with ASTM Method E-152 at the Warnock Hursey International, Inc. fire test facility. The test showed that the temperature rise on the unexposed side of the door did not exceed 250° F. above the ambient temperature during the first 30 minutes of the fire test. This performance meets the requirement of major building codes for certain fire-rated doors.

In summary, it can be said that the present invention provides the means which makes it possible to manufacture in economic fashion an improved fire-resistant article which can be used to significant advantage in articles including fire doors which are effective in deterring the spread of fire.

We claim:

1. A method for making a fire-resistant article from a composition which includes a major amount of a light-weight friable material and other materials in particulate form, including starch adhesive, comprising: (A) dry-mixing a major amount of expanded perlite and a minor amount of an adhesive material, the major portion thereof being gelatinized starch, for a period of time sufficient to produce a mixture in which the constituents thereof are distributed uniformly therethrough; (B) wetting said particulate materials by applying thereto water at a time just prior to or upon the formation of said mixture; (C) continuing the mixing to distribute the water throughout said mixture; (D) promptly shaping said wetted mixture after its formation into the form of said article under conditions which involve compressing a supported form of said mixture; (E) recovering in an unsupported form the freshly shaped and compressed mixture, the green strength thereof being sufficiently high for the shaped mixture to be shape-retaining and to be handled without damage; and thereafter (F) drying said mixture.

2. A method according to claim 1 wherein the density of said dried mixture does not exceed about 22 lb/cu ft.

3. A method according to claim 2 wherein substantially all of said adhesive material is said starch.

4. A method according to claim 3 wherein said wetted mixture is compressed to about 50 to about 60% of its original volume.

5. A method according to claim 4 wherein said mixture is dried for a period of time sufficient to reduce its moisture content to about 3 wt. % or less.

6. A method according to claim 1, 2, 3, 4, or 5 wherein said wetted mixture is shaped and compressed into the form of a fire-door core.

7. A method according to claim 6 wherein the amount of composition which is dry-mixed is approximately sufficient to form but a single core.

8. A method according to claim 7 wherein substantially all of said water is added within about 10 seconds before mixing is terminated.

9. A light-weight, fire-resistant article comprising a major amount of expanded perlite in compressed form and a minor amount of an adhesive material, the major portion thereof being gelatinized starch, said article having a density of no greater than about 22 lb/cu ft.

10. An article according to claim 9 having a moisture content of no greater than about 3 wt. % and comprising the set product of an unset, compressed mixture comprising about 45 to about 70 wt. % of said perlite, about 5 to about 20 wt. % of said starch, and about 22 to about 34 wt. % of water, the green strength of said unset, compressed mixture being sufficiently high for the mixture to be shape-retaining and to be handled without damage.

11. An article according to claim 10 wherein said mixture includes also at least about 0.1 wt. % of glass fibers.

12. An article according to claim 11 wherein said mixture comprises about 60 to about 65 wt. % of said perlite, about 8 to about 12 wt. % of said starch, about 25 to about 30 wt. % of said water and about 0.5 to about 0.8 wt. % of said glass fibers.

13. An article according to claim 9 having a density of about 10 to about 22 lb/cu ft, a compressive strength of at least about 100 psi, a flexural strength of about 35 to about 175 lb, and a tensile strength of about 10 to about 40 lb/sq in.

14. An article according to claim 13 having a density of about 16 to about 20 lb/cu ft, a compressive strength of at least about 140 psi, a flexural strength of at least 50 lb, and a tensile strength of at least about 15 lb/sq in.

15. An article according to claim 9, 10, 11, 12, 13, or 14 in the form of a fire door core.

16. A core according to claim 15 wherein said starch is an ethylated dent, modified corn starch comprising about 25% amylose with about 2.6–2.7% substitution of ethylene oxide.

17. A metal fire door including the core of claim 15.

18. A fire door according to claim 17 comprising metallic sheets at the side faces of the door, the sheets being interconnected with each other at the edges of the door and being laterally spaced from each other to provide an interior space to accomodate said core, a core in said interior space, and the metallic sheets being adhesively bonded to the side faces of the core.

* * * * *